United States Patent [19]

Tironi et al.

[11] 4,412,334

[45] Oct. 25, 1983

[54] METHOD OF MELTING VITREOUS MATERIALS AND USE OF THE SUITABLE DEVICE FOR THE ACCOMPLISHMENT OF THE METHOD

[75] Inventors: Maurizio G. Tironi, Modena; Mario Barbini; Giannetto Del Sere, both of Florence, all of Italy

[73] Assignee: Elettromeccanica Tironi S.r.l., Italy

[21] Appl. No.: 365,984

[22] Filed: Apr. 6, 1982

Related U.S. Application Data

[63] Continuation of Ser. No. 117,853, Jan. 31, 1980.

[30] Foreign Application Priority Data

Feb. 19, 1979 [IT] Italy ............................... 40024 A/79

[51] Int. Cl.³ .............................................. C03B 5/027
[52] U.S. Cl. .................................................... 373/40
[58] Field of Search ...................... 373/27, 29, 39, 40, 373/135, 120, 136

[56] References Cited

U.S. PATENT DOCUMENTS

| | | |
|---|---|---|
| 2,902,524 | 9/1959 | Paxton . |
| 3,395,237 | 7/1968 | Orton . |
| 3,524,918 | 8/1970 | Goto . |
| 3,566,151 | 2/1971 | Wilburn . |
| 3,633,095 | 1/1972 | Hood . |
| 3,818,112 | 6/1974 | Clishem et al. . |
| 3,878,358 | 4/1975 | Barton et al. . |
| 3,961,236 | 6/1976 | Rodek et al. . |
| 3,984,611 | 10/1976 | Varrasso . |

Primary Examiner—Roy N. Envall, Jr.
Attorney, Agent, or Firm—Browdy and Neimark

[57] ABSTRACT

In a method of melting vitreous materials, the thermal energy to be supplied electrically to the vitreous mass is controlled by supplying the melting plant according to supplying cycles consisting of pre-established intervals of time during which the power applied to the plant is much higher than the maximum permissible input when the plant is continuously supplied, spaced by pre-established intervals of time during which the plant is not supplied. The length of said intervals of time is equivalent to an integral number of cycles of the alternating voltage acting on the electrodes.

4 Claims, 5 Drawing Figures

METHOD OF MELTING VITREOUS MATERIALS AND USE OF THE SUITABLE DEVICE FOR THE ACCOMPLISHMENT OF THE METHOD

This is a continuation of application Ser. No. 117,853 filed Jan. 31, 1980.

The invention concerns a method of melting vitreous materials and the use of the suitable device for the accomplishment of the method, that is to say an improved process of transforming vitrifiable mixtures and/or frits into glass such as calcium-sodium, borosilicate or crystalline glass, glass for fibres, crystals, glazes, enamel frits in general and others and/or of obtaining and/or maintaining by it the homogenizing and the purification of the gas it contains; the device employed to carry out this methiod can result from electromechanical and/or electronic element, applicable in completely electric glass melting or refining plants as well as in those, where the electric device generally intervenes only as an added part or as an assisting part of the process, such a device being already known in other technical sectors. The prior state of art involves methods to supply thermal energy to the melted vitreous mass, this thermal energy being obtained exclusively by combustion or only by Joule effect by means of current circulation within the mass itself, this circulation being obtainable by continuous application of alternate voltage to electrodes in direct or non-direct electrical contact with said mass; moreover, the supply of thermal energy can be obtained by combining the combustion method with the Joule effect method; as for the control of the thermal energy supplied electrically by means of Joule effect, this was carried out by variation of the amplitude of the alternate voltage applied continuously to the electrodes by means of variation by steps of the turns ratio of the transformer(s) feeding the plant obtainable by using commutators in the absence of voltage and load, in the absence of load only or also in the presence of load; the amplitude of the alternate voltage can, moreover, be varied with continuity connecting a loaded brush-type or similar regulation unit to the main transformer.

Purely experimental attempts to control the power by means of shuting the voltage wave applied to the electrodes obtainable with an electronic and/or electromechanical device did not lead to positive results because of the following negative features: power factor even considerably inferior to 1; presence of steep fronts in the current wave with following disturbances in the mains net; difficulty to obtain economically the absence of continuous current superimposed to the alternate current wave circulating within the vitreous mass with consequent development of the phenomenon of polarization and of other negative phenomena for the production of glass. This prior state of art is subject to further improvements, particularly with regard to: the obtaining of a better homogenization of the vitreous mass, a better purification of gas, the reduction of the changing time of the vitreous mass and of the related defects; the increase of the capacity of the plant in reference to the total absorbed electric power; the increase of the active surface of the electrodes, the reduction of the negative secondary effects in consequence of phenomena that are due to polarization in proximity of the electrodes; the maintenance of the plant and the reduction of the related down times; the reduction of the cost of the electric plant at the moment of purchase as well as at the installation and during its operation.

From the aforesaid derives the necessity of finding a method which allows mainly to obtain the above further improvements; it must be possible to carry out the method itself by means of an economical and reliable device of reduced maintenance, easily found on the market and rapidly replaced in case of breakdown.

The invention resolves the above technical problem by adopting a method of control of the thermal energy supplied electrically to the vitreous mass, which foresees the inlet of the maximum electric power, for which the plant is rated, during pre-established time intervals, consisting of an entire number of voltage wave cycles acting on the electrodes, spaced by pre-established time periods also consisting of an entire number of wave cycles, during which the electric power is not applied; this inlet being obtained by provoking pre-established successions of conduction or non-conduction states of electronical and/or electromechanical components inserted into the electrode feed circuit; for this purpose it is possible to use, amongst others, one of those interruption devices employed in other technological fields only for the adjustment of electric power without being of any help for the methods and without manifest positive effects on the results of the concerned technological processes.

The main advantages obtained by this invention are: the reduction of the negative secondary effects in consequence of phenomena due to a polarization in proximity of the electrodes such as the development of gaseous inclusions during the process of melting and/or refining and/or homogenization of the vitreous mass; this being made possible by the features of alternating of conductive states with non-conductive states (wave trains); the reaching of a power distribution in the furnace sections during the conduction periods, which approaches the optimum distribution foreseen for the operation of the plant at maximum capacity; in those parts of the vitreous mass with minor temperatures from the aforesaid resulting reduced variations compared to those observed with the application of traditional power control methods; thus a better homogenization of the vitreous mass is obtained because of more energetical thermal convection motions in those parts of the vitreous mass, which are at lower temperature; the consequent reduction of the quality changing times of the vitreous mass and of the related defects such as striae, cords and not melted granules; a better energetic efficiency of the plant owing to the fact that it is not necessary to apply considerably higher power to the parts of the vitreous mass already at a higher temperature than that required by these parts in order to obtain the indispensable minimum power for the sufficient homogenization of those parts of the vitreous mass, which are at a lower temperature; a better purification of gas following to the more energetic convection motions and to the fact that there need not be excessive power in the hotter areas, which eliminates the reboil effect due to an excessive density of electric current; increase of the active surface of the electrodes in consequence of the increase in temperature of those parts of the vitreous mass, which are at a lower temperature and therefore less conductive; reduction of the wear of the electrodes and/or of the other parts of the plant in electrical contact with the glass, thanks to the minor density of the electric current; greater simplicity of adjustment of the state of the melted vitreous mass.

One way of carrying out the invention is illustrated—just in order to give an example—in the two enclosed drawings tables, in which.

Figure 1:
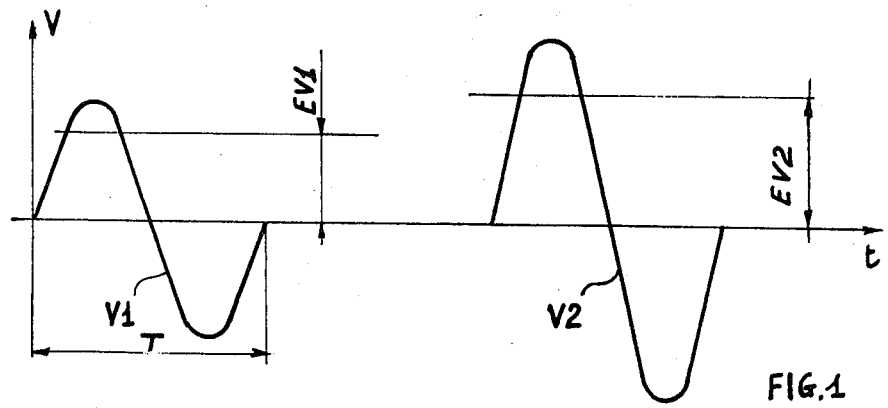
FIG. 1 is the diagram of the voltage applied to the electrodes in the case of control of the power introduced into the furnace by means of a traditional device suitable for the variation of the voltage amplitude.
Figure 2:
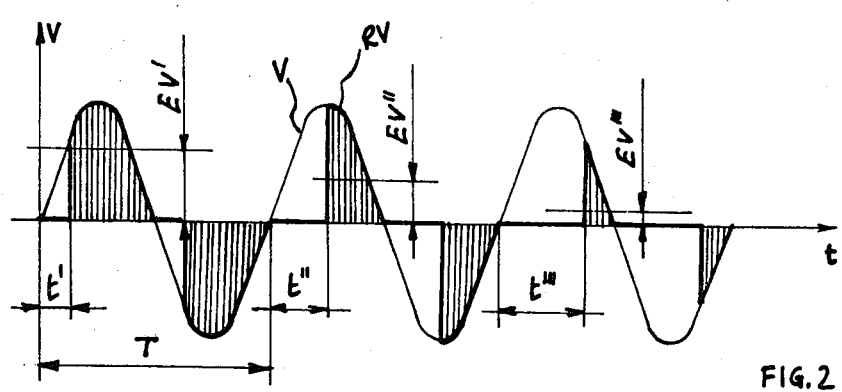
FIG. 2 is the diagram of the volage applied in the case of control by means of a device suitable for the variation of the effective value of the voltage by acting on the ignition with variable delays that is to say by shuting the wave, which was already object of experimental attempts; such a type of control not being preferable because of the already mentioned negative features.
Figure 4:
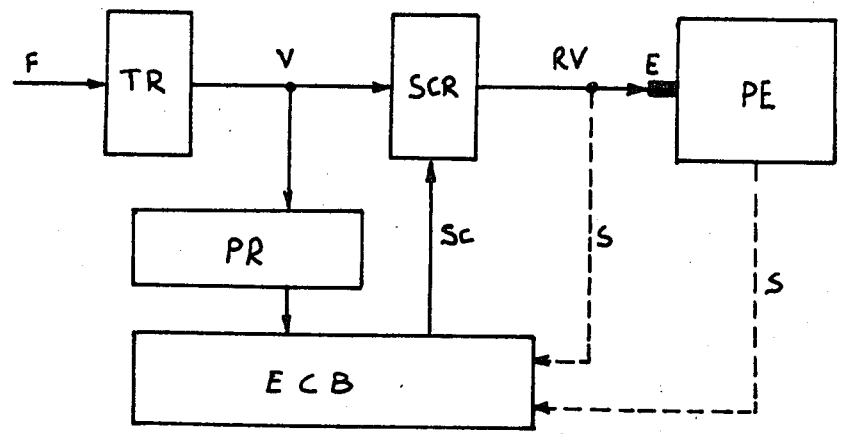
FIG. 4 is the block diagram of the circuit serving to obtain the control of the voltage in the ways of FIGS. 2 and 3.
Figure 5:
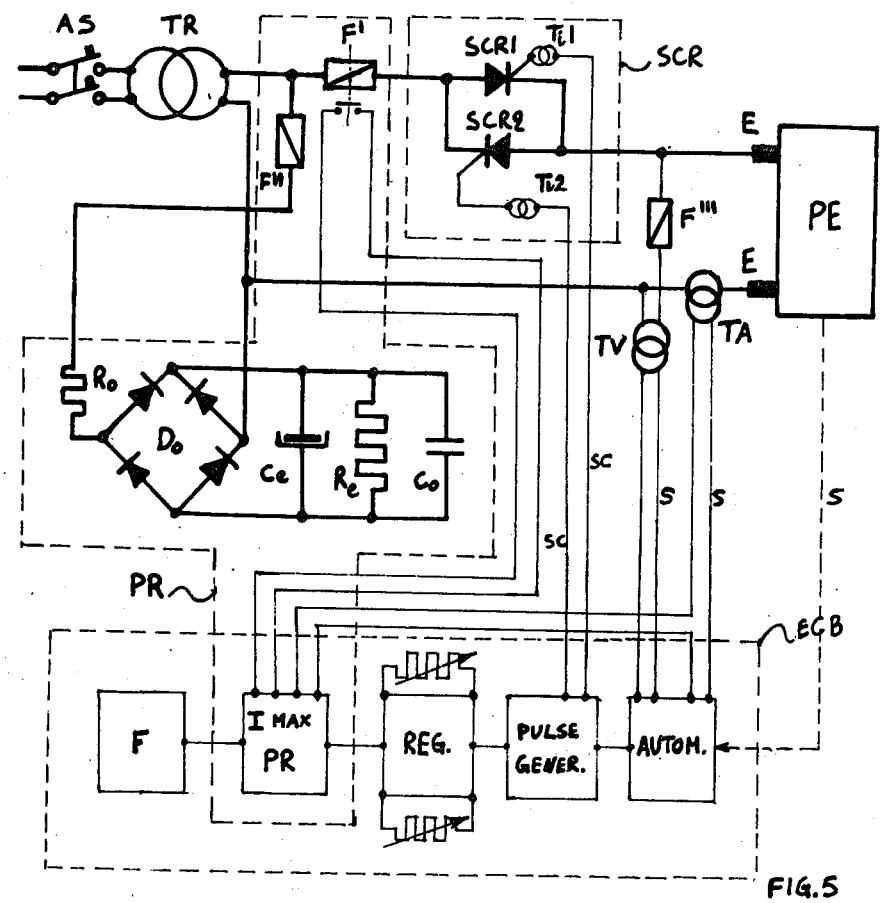
FIG. 5 is a wiring diagram, for reasons of simplicity singlephase and related to only one couple of electrodes with regard to the power circuits only.

The indications are as follows: V is the voltage, t is the time, T is the cycle; V1 and V2 indicate respectively with voltage waves having an effective value of EV1 and EV2; RV (FIG. 2) indicates the adjusted voltage having effective values of EV', EV'', EV''' respectively during the cycles, in which the conduction is delayed by t', t'', t'''; EV (FIG. 3) is the effective value of the not adjusted voltage wave V during each cycle T and ERV indicates the effective value of the adjusted voltage wave RV during the reference time P, periodically repeated; tc and tnc indicate respectively the time corresponding to the conduction cycles n1T and to the non-conduction cycles n2T; F (FIG. 4) indicates the electric input, TR a possible transformer; SCR indicates the electronic power circuits based upon thyristors, which supply the general electrode E of the charge, consisting, for instance, of a glass furnace PE, at an adjusted voltage; PR indicates the electric power protections from untimely opening of the general switch AS (FIG. 5); ECB indicates the electronic control and protection board, which serves to control, by means of the SC signals, the power electronics SCR; S indicates the reference signals concerning the state of the charge PE and/or the adjusted input in order to carry out possible automatic adjustments, which permit to maintain continuously at the optimum value the parameters to be adjusted such as, mainly but not exclusively, current, power, and temperature; SCR1 and SCR2 indicate a couple of thyristors respectively controlled by the pulse transformers Ti1 and Ti2, which are, in their turn, controlled by the control electronics; F', F'', and F''', indicate some fuses; TA and TV indicate respectively current and voltage transformers to feed the electrical measuring instruments and/or possible transducers for the already mentioned automatic adjustments; Ro and Re are electric resistance and Do is a diode bridge, feeding the electrolytic condenser CE and the condenser Co: the whole forming a protection against excess voltage before the SCR.

The operation—with reference to the method making use of the power control according to the diagram of FIG. 3, using the device of FIGS. 4 and 5—takes place in the following manner: once closed the switch AS, the transformer is supplied from the mains, obtaining at the secondary the voltage V, which initially does not arrive at the electrodes E, as the thyristors SCR are not energized; by acting on a potentiometer built into the electronic control board ECB, voltage is obtained at the pulse transformers Ti1 and Ti2, which start the conduction of the thyristors SCR, determinating the application of the entire voltage V to the electrodes E and, consequently, the circulation of current in the glass furnace; the control of the power introduced into the vitreous mass is obtained by varying the conduction time tc and the fixed reference time P for entire cycles of T; or, keeping the time tc fixed, it is possible to vary the reference time P: the latter by acting on a second potentiometer; or also by varying in any suitable manner the ratio tc/P; thus, at the electrodes E, wave trains of voltage RV alternated with tnc times of voltage absence are obtained: these wave trains being in phase with the wave trains of the current derived from them; therefore the feature of operation at a power factor equal to 1 is maintained, which is typical of the traditional controls adopted for the glass furnaces and advantageous for the economy of operation and of the electric installation.

By taking indications about the state of the input (current or power during the time P or others) or about the state of the charge (temperature or others), it is possible to supply transducer circuits included in the electronic control board ECB, which act upon the ratio tc/P in such a way as to keep constant the quantity either of the input or of the state of the charge which one prefers to control: therefore, the plant maintains automatically the selected quantity at the pre-established optimum value, even if the charge PE or the input F vary.

Figure 3:
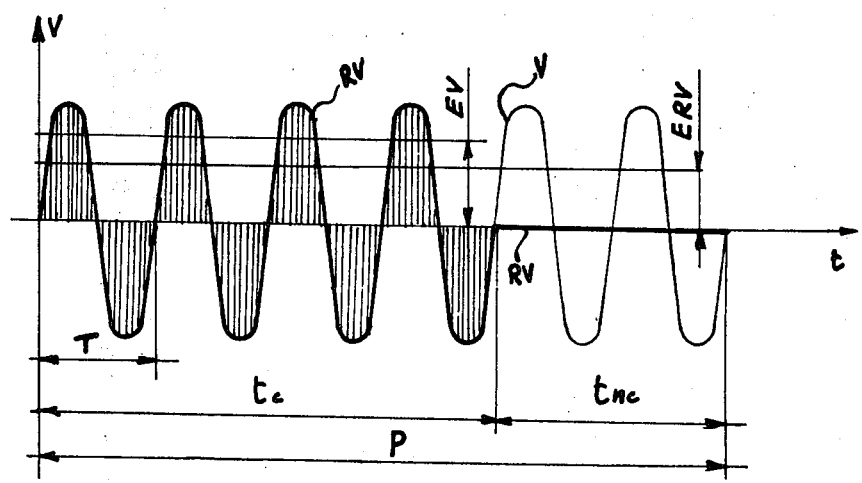
FIG. 3 is the diagram of the case of adjustment of the applied voltage according to this invention by means of a device suitable for the variation of the effective value of the voltage alternating conduction cycles with non-conduction cycles in a measure that may also be variable within a definite interval of reference time in order to vary the effective value of the voltage during said interval.

For the practical realization the components of the device might change, keeping, however, the operation principle of control by means of wave trains inaltered, without leaving the juridical dominion of this invention: thus, for instance, the wave trains of the diagram of FIG. 3 might be obtained—in case of limited power—by acting on the input circuit in such a way as to interrupt its continuity for programmed time periods with the use of electromechanical devices of various types, provided that these are suitable for the opening and closing of the circuit, thus permitting the passage of power only in the shape of wave trains.

We claim:

1. A method of melting vitreous materials in electric melting plants by controlling the thermal energy supplied electrically to the vitreous mass during the process of melting and/or refining and/or homogenization, comprising the steps of supplying energy to the plant according to supply cycles each having a time interval P, making up each supply cycle P of a time period $t_c$ when power is supplied to said vitreous mass and a time period $t_{nc}$ when no power is supplied, selecting the lengths of said intervals of time $t_c$ and $t_{nc}$ to be each equivalent to an integral number of cycles of the alternating voltage acting on the electrodes, sensing the values of selected operating parameters of said plant, including current, power and/or temperature providing means to control the ratio of $t_c$ to P, feeding signals proportional to said sensed values of said ratio control means, and using said feed back signals to adjust the ratio of $t_c$ to P in each time interval P in response to variations of the values of said selected parameters.

2. The method of claim 1, and supplying electric power to the plant during each time period $t_c$ at a level higher than the maximum permissible input were the plant continuously supplied with electric power.

3. Apparatus for melting vitreous materials in electric melting plants by controlling the thermal energy supplied electrically to the vitreous mass during the process of melting and/or refining and/or homogenization, comprising means for supplying energy to the plant according to supply cycles each having a time interval P, circuit means for making up each supply cycle P of a time period $t_c$ when power is supplied to said vitreous mass and a time period $t_{nc}$ when no power is supplied, said circuit means including means for selecting the lengths of said intervals of time $t_c$ and $t_{nc}$ to be each equivalent to an integral number of cycles of the alternating voltage acting on the electrodes, means for sensing the values of selected operating parameters of said plant, including current, power and/or temperature means to control the ratio $t_c$ to P, means for feeding signals proportional to said sensed values to said ratio control means, and using said feedback signals to adjust the ratio of $t_c$ to P in each time interval P in response to variations of the values of said selected parameters.

4. The apparatus of claim 3, and means for supplying electric power to the plant during each time period $t_c$ at a higher level than the maximum permissible input were the plant continuously supplied with electric power.

* * * * *